June 28, 1927.

L. R. CORDRAY 1,634,069

VEHICLE SPEED LIMIT INDICATING AND CONTROL MEANS

Filed Nov. 12, 1924    2 Sheets-Sheet 1

Inventor

LEE ROY CORDRAY

By A. B. Bowman

Attorney

June 28, 1927.

L. R. CORDRAY 1,634,069

VEHICLE SPEED LIMIT INDICATING AND CONTROL MEANS

Filed Nov. 12, 1924    2 Sheets-Sheet 2

Inventor

LEE ROY CORDRAY.

By A. B. Bowman

Attorney

Patented June 28, 1927.

1,634,069

UNITED STATES PATENT OFFICE.

LEE ROY CORDRAY, OF SAN DIEGO, CALIFORNIA.

VEHICLE SPEED-LIMIT INDICATING AND CONTROL MEANS.

Application filed November 12, 1924. Serial No. 749,566.

My invention relates to a vehicle speed-limit indicating means, and the objects of my invention are: First, to provide a means of this class which will signal to the operator of the vehicle on which it is mounted when the vehicle proceeds faster than a predetermined speed or the speed at which the means is set; second, to provide a means of this class which may be readily adjusted and set by the operator of the vehicle for different speed limits, depending upon the speed restrictions in the sections in which the operator is driving; third, to provide a means of this class whereby the operator of the vehicle is given a warning signal when the vehicle proceeds at a speed greater than permitted and at which the means is set, and a means whereby the ignition or fuel or both are cut off from their respective supplies or sources when the vehicle proceeds at a speed greater than that at which the signal is given; fourth, to provide a means of this class whereby all speed restrictions, speed limit warnings and ignition and fuel cutouts may be cut out, and the vehicle permitted to proceed at a speed to the limit of its power in case of emergency; fifth, to provide a novelly constructed switch means for a vehicle speed limit indicating means; sixth, to provide novelly operated means for controlling the positions of the switch means; seventh, to provide as a whole a novelly constructed vehicle speed limit indicating means; eighth, to provide a means of this class which is positioned intermediate the speedometer of the vehicle and the end of the flexible chain or cord conventionally connected with the speedometer, and ninth, to provide a means of this class which is simple and economical of construction, durable, efficient, reliable, easy to operate, and which will not readily deteriorate or get out of order.

Figure 1:
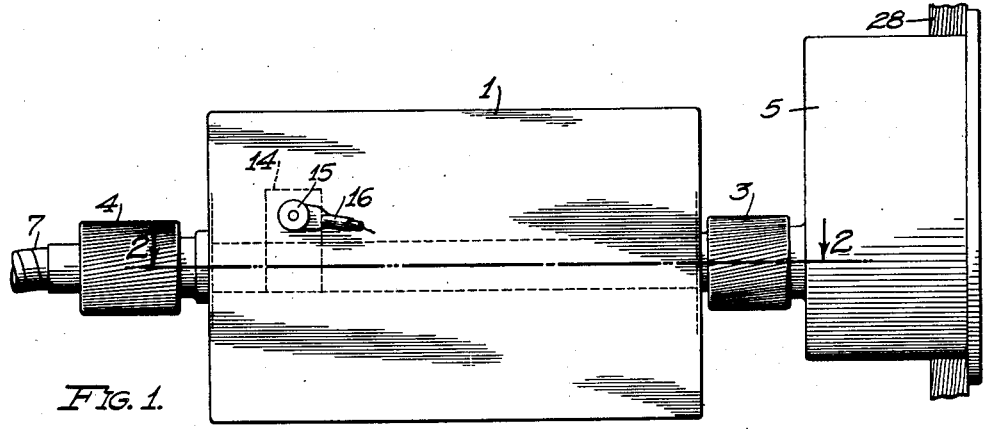
Figure 2:
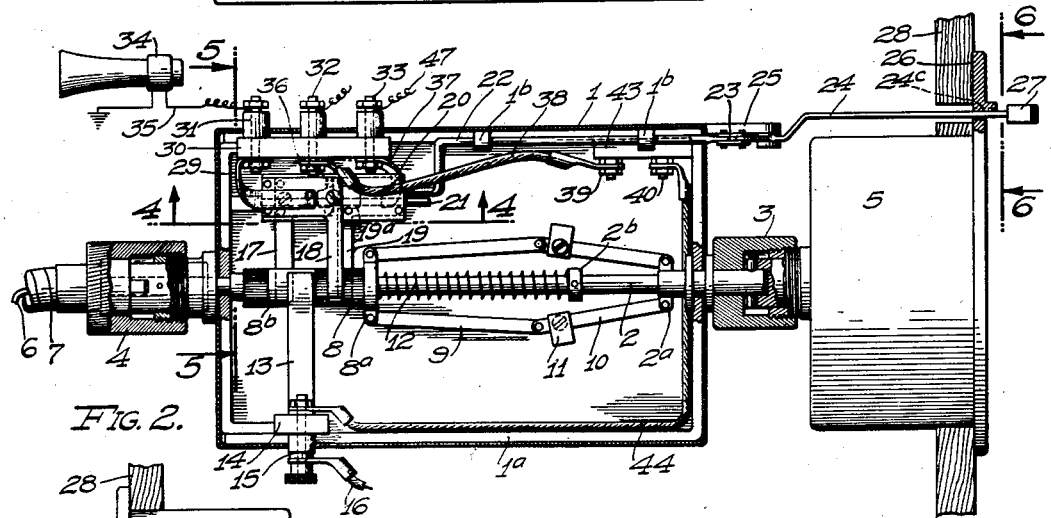
Figure 3:
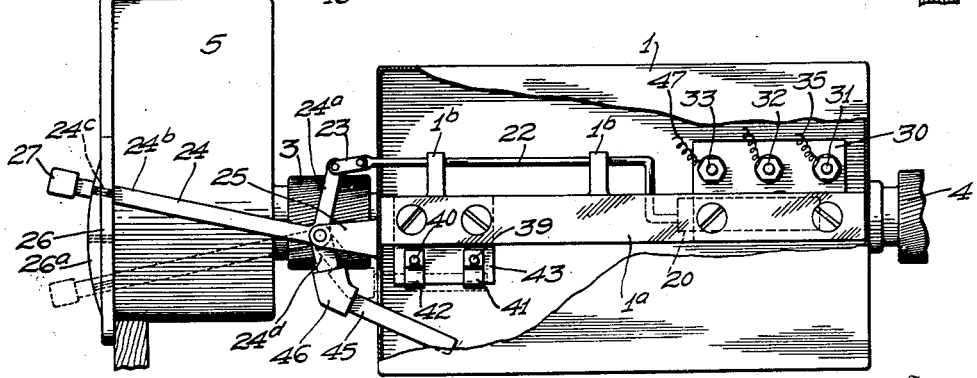
Figure 4:
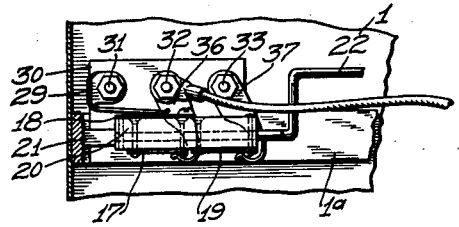
Figure 6:
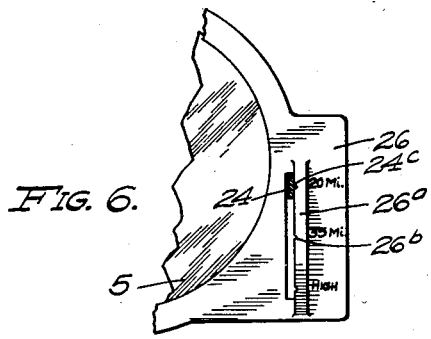
Figure 5:
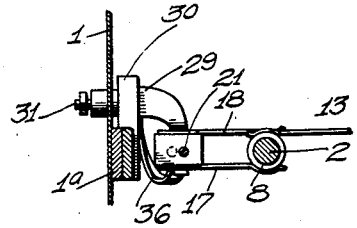
Figure 7:
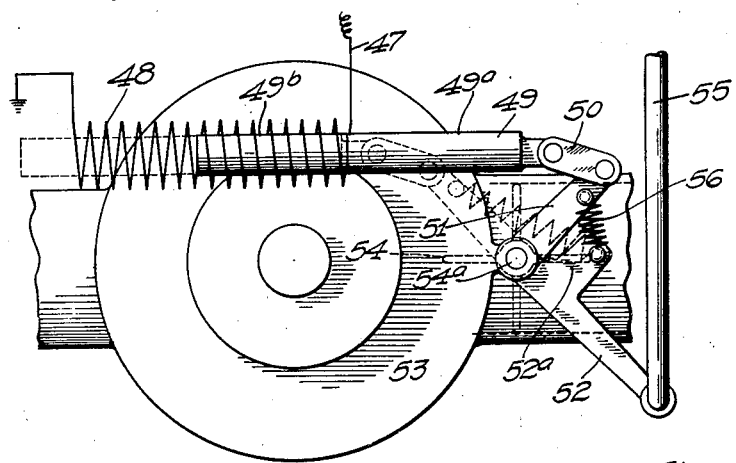
Figure 8:
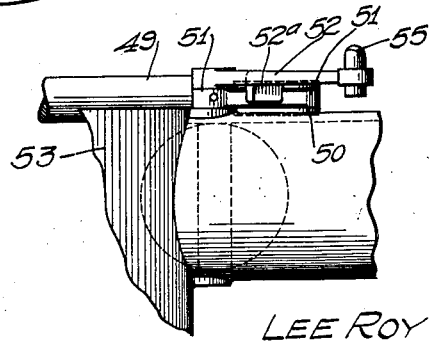

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my vehicle speed limit indicating means positioned behind the speedometer of a vehicle and directly connected therewith and with the one end of the drive-chain normally connected with the speedometer; Fig. 2 is a sectional view thereof in plan, with the section taken through 2—2 of Fig. 1, showing certain parts and portions in plan and others fragmentarily to facilitate the illustration, and showing one of the terminal posts thereof diagrammatically connected with a horn; Fig. 3 is an elevational view thereof, taken from the opposite side of the means from that shown in Fig. 1; Fig. 4 is a sectional view thereof, taken through 4—4 of Fig. 2, showing particularly the multiple switch means; Fig. 5 is a sectional view, taken through 5—5 of Fig. 2, showing particularly an end elevation of said switch means; Fig. 6 is a fragmentary front elevational view of the speedometer of the vehicle and a quadrant means in connection therewith for positioning the control lever of my indicating means; Fig. 7 is a fragmentary plan view of a carbureter with its control mechanism, showing the electro-magnetically controlled mechanism of my means in connection therewith for cutting off the fuel supply, and Fig. 8 is a fragmentary elevational view of the mechanism shown in Fig. 7.

Like characters of reference refer to similar parts and portions throughout the several views of the drawings.

The casing 1, shaft 2, couplings 3 and 4, speedometer 5, flexible speedometer drive-chain 6, flexible tube 7, rotor 8, governor links 9 and 10, weights 11, governor compression spring 12, feed contact brush 13, insulating support 14, terminal post 15, conductor 16, contact brushes 17, 18 and 19, contact brush support 20, supporting rod 21, contact brush shifting member 22, links 23, contact brush shifting lever 24, bracket 25, plate 26, knob 27, dash member 28, flexible contact member 29, insulating support 30, terminal posts 31, 32 and 33, horn 34, conductor 35, flexible contact members 36 and 37, conductor 38, terminal posts 39 and 40, switch members 41 and 42, insulating support 43, conductor 44, blade switch member 45, insulating blade switch supporting member 46, conductor 47, electro-magnet 48, core 49, links 50, butterfly valve control levers 51 and 52, carbureter 53, butterfly valve 54, control rod 55, and the spring 56, constitute the principal parts and portions of my automobile speed limit indicating means.

My speed limit indicating means consists essentially of a governor controlled rotor operated by the flexible speedometer drive-chain and adapted to variously connect a source of electrical energy with a plurality of contact brushes connected with a signaling means, the ignition system of the vehicle and the fuel supply, and a manual means for variously positioning said contact brushes relatively to said rotor separate and apart from the movement of the latter.

The shaft 2, upon which the governor and rotor are mounted, extends through and is revolubly mounted in the casing 1 and is connected at one end by means of a coupling 3 with the speedometer 5 of the vehicle, and at its opposite ends by means of the coupling 4 with the speedometer drive-chain 6 and the tube 7 through which the chain 6 extends. The rotor 8 is reciprocally mounted on the shaft 2 within the casing, and is made of any suitable insulating material and provided intermediate its ends with a current conducting band 8$^b$ of the same diameter as the insulating material at either end thereof. At the one end of the rotor 8 are provided a pair of diametrically opposed lugs 8$^a$ to which are pivotally connected the one ends of the governor links 9, which links are pivotally connected at their opposite ends with the one ends of the links 10, which links 10 are pivotally connected at their opposite ends to another pair of diametrically opposed lugs 2$^a$ secured to the shaft 2 within the casing and at the end opposite the rotor 8. On the links 10 of the governor are adjustably mounted weights 11. Against the inner end of the rotor 8 is positioned the one end of the governor compression spring 12, which is mounted around the shaft 2 and engages at its opposite end a collar 2$^b$ secured to the shaft 2.

At one end and one side of the casing 1 is secured an insulating support 14 on which is mounted a terminal post 15 which extends through the casing 1. Intermediate the upper and lower sides of the casing 1 and extending around the same within its walls is preferably provided a band 1$^a$ for reinforcing the casing and supporting the insulating member 14 as well as other members within the casing. Supported on the support 14 and secured to the terminal post 15 is a flexible feed brush 13 which engages at all times the contact band 8$^b$ of the rotor 8. The terminal post 15 is connected by means of a conductor 16, with a suitable source of electrical energy.

Within the casing 1 and at the side thereof opposite the contact brush 13 is provided a longitudinally extending support or rod 21 upon which is reciprocally mounted the contact brush support 20 made of insulating material. At the under side of the support 20 are secured a pair of spaced apart contact brushes 17 and 19, the free ends of which are positioned in engagement with the rotor 8. At the upper side of the member 20 is secured another flexible contact brush 18, the free end of which is also positioned in engagement with the rotor 8. At the same portion of the casing at which the reciprocally mounted insulating contact brush support 20 is positioned, is mounted an insulating support 30 having a plurality of terminal posts 31, 32 and 33. To the terminal post 31 is secured a flexible contact member 29 which is adapted to frictionally engage the portion of the contact brush 18 secured to the upper side of the member 20. To the terminal posts 32 and 33 are respectively secured other flexible contact members 36 and 37, which are adapted to frictionally engage the enlarged portions of the contact brushes 17 and 19 secured to the under side of the contact brush support 20, as shown best in Figs. 2 and 4. The terminal post 31 is connected by means of a conductor 35 with a horn 34 or any other suitable signaling means adapted to be observed by the driver of the vehicle. The terminal post 32 is connected with the ignition system of the vehicle, while the terminal post 33 is connected with an electro-magnet 48 by means of the conductor 47 for shutting off the supply of fuel to the carbureter 53 when the vehicle proceeds at a speed greater than that for which the means is set.

It will be here noted that the contact brushes 17, 18 and 19, connected respectively with the signal means 34, the ignition system and the fuel supply means, are so positioned relatively to the current conducting band 8$^b$ of the rotor that, when the vehicle proceeds at a certain speed near the limit at which the means is set, the contact brush 17 will be in engagement with the band 8$^b$ of the rotor, and before said band will pass beyond the contact brush 17, the brush 18 will engage said band, connecting the horn or other signal means 34 with a source of electrical energy and give the operator of the vehicle a signal as to its speed. If the operator does not heed the signal and continues to proceed at a greater rate of speed, the contact brush 17 is disconnected from engagement with the contact band 8$^b$, disconnecting the ignition system of the vehicle from a source of electrical energy. At the same time the contact brush 17 is disconnected from the band 8$^b$, the contact brush 19 is connected with said band, thus connecting the electro-magnet 48 with a source of electrical energy, shutting off the fuel supply, as will be described later.

To the one end of the contact brush supporting member 20 is secured a contact brush shifting member 22 which is reciprocally mounted in lugs 1$^b$ extending upwardly from the reinforcing band 1$^a$ of the casing 1. This member 22 extends through the wall of the casing and is pivotally connected at the portion extending through the casing, by means of links 23, with the short arm 24ᵃ of the bellcrank control lever 24, which is pivotally mounted in the bracket 25 extending outwardly from the casing 1. The long arm 24ᵇ of the lever 24 extends through a plate 26 which may be an integral part of the flange of the speedometer, as shown in Figs. 2 and 6. On the plate 26 is preferably provided a quadrant portion 26ᵃ which is provided on the one side contiguous to the lever 24 with a plurality of notches 26ᵇ into which is adapted to be inserted a correspondingly shaped lug 24ᶜ at the one side and near the end of the lever 24 for holding said lever in a certain shifted position, the inherent spring of the metal of the lever 24 holding the long arm thereof against the quadrant portion 26ᵃ. The end of the long arm of the lever 24 extending through the plate 26 is preferably provided with a knob 27 for readily shifting the same. The plate 26 is preferably secured to the dash member 28 of the vehicle upon which the speedometer is conventionally supported.

Within the casing 1 is provided another insulating support 43 which is provided with a pair of terminal posts 39 and 40 which support a pair of switch members 41 and 42, respectively, to the outer side of the support 43. The terminal posts 39 and 40 are connected, respectively, by means of conductors 38 and 44, with the terminal posts 32 and 15. The bellcrank lever 24 is provided with another arm 24ᵈ which extends downwardly and is provided at its lower end with an insulating member 46 which supports a blade switch member 45. When the control lever 24 is shifted to its extreme lower position, as indicated by dotted lines in Fig. 3, the blade switch member 45 engages and short-circuits the switch members 41 and 42, thus directly connecting the feed conductor 16, through the terminal post 15, the conductor 44, the blade switch member 45, the conductor 38, through the terminal post 32 with the ignition system of the vehicle. This latter mechanism is adapted to cut out the action of the rotor in connection with the several contact brushes and directly connect the ignition system with the source of electrical energy in case of emergency such as when passing another car on the highway.

At the one end of the enlarged portion of the contact brush 19, which supports the same on the support 20, is provided a cut out portion 19ᵃ, as shown best in Fig. 2. Into this cut out portion 19ᵃ is adapted to slide the contact portion at the end of the contact member 37 when the lever 24 is shifted to its extreme downward position, thus preventing the fuel from being shut off when the vehicle is operating at a high speed.

The means for shutting off the fuel supply, when the control lever 24 is shifted to its lower position, consists of an electro-magnet 48 in which is reciprocally mounted a core 49 consisting of an iron portion 49ᵃ normally positioned without the electro-magnet and a brass portion 49ᵇ normally positioned within and guided by the electro-magnet. The outer end of the core 49 is connected by means of links 50 with the outer end of the fuel control lever 51 which is secured at its opposite end to the rod 54ᵃ to which the butterfly valve 54 of the carbureter 53 is secured. On the rod 54ᵃ is pivotally mounted the one end of the fuel control lever 52 which is normally controlled by a rod 55, the position of the lever 51, as shown by solid lines, and the lever 52, being such as to permit fuel to be fed to the engine. Normally, when controlling the butterfly valve 54 by the rod 55, the lever 51 is shifted with the lever 52, a spring 56 yieldably holding the lever 51 in engagement with an enlarged portion 52ᵃ near the pivoted end of the lever 52, as shown best in Fig. 7. When the lever 52 is in the position shown and the control lever 24 in an upwardly shifted position, as shown in Fig. 6, and when the vehicle proceeds at a speed greater than that intended, the electro-magnet 48 becomes electrified, attracting the iron portion 49ᵃ of the core 49 rotating the lever 51 independently from the lever 52, as shown by dotted lines, rotating the butterfly valve to the transverse position and shutting off the fuel supply.

It is obvious from this construction, as illustrated in the drawings and disclosed in the foregoing specification, that there is provided a vehicle speed-limit indicating means as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. In a speed indicating and controlling means, a shaft, a centrifugal governor mounted on said shaft, a rotor reciprocally mounted on said shaft and controlled in its reciprocal movement by said governor and provided with an annular contact portion, a shiftable contact brush positioned in engagement with said rotor and adapted to be engaged by the contact portion thereof, a signal means connected with said contact brush, a lever means connected with said contact brush adapted to variously shift the same relatively to the contact portion of said rotor, other contact brushes positioned in engagement with said rotor, one being positioned in engagement with the contact member of said rotor and adapted to be disconnected therefrom when said shaft is rotated at a predetermined speed, and another of said other contact brushes being adapted to be engaged by the contact member of said rotor when said shaft is rotated at said predetermined speed, and an electro-magnet controlled butterfly valve of a fuel supply means connected with said last mentioned contact brush.

2. In a speed indicating and controlling means, a shaft, a centrifugal governor mounted on said shaft, a rotor reciprocally mounted on said shaft and controlled in its reciprocal movement by said governor and provided with an annular contact portion, a shiftable contact brush positioned in engagement with said rotor and adapted to be engaged by the contact portion thereof, a signal means connected with said contact brush, a lever means connected with said contact brush adapted to variously shift the same relatively to the contact portion of said rotor, other contact brushes positioned in engagement with said rotor, one being positioned in engagement with the contact member of said rotor and adapted to be disconnected therefrom when said shaft is rotated at a predetermined speed, and another of said other contact brushes being adapted to be engaged by the contact member of said rotor when said shaft is rotated at said predetermined speed, an electromagnet controlled butterfly valve of a fuel supply means connected with said last mentioned contact brush, and a switch means in connection with one of said other contact brushes for independently connecting the conductor leading therefrom with a source of electrical energy when said control lever is shifted to an extreme position.

3. In a vehicle speed indicating and control means of the class described, a shaft connected with the running gear of the vehicle, a governor mounted on said shaft and actuated thereby, an insulating member reciprocally mounted on said shaft and actuated in its reciprocal movement by said governor and provided with a contact portion, a contact brush connecting the contact portion of said insulating member with a source of electrical energy, another contact brush positioned in engagement with the contact member of said insulating member, a reciprocal support for said last mentioned contact brush, a terminal post, a yieldable contact member connecting said terminal post frictionally with said last mentioned contact brush, and a control lever connected with said reciprocal support for shifting the same and said last mentioned contact brush relatively to the contact member of said insulating member.

4. In a vehicle speed indicating and control means of the class described, a shaft connected with the running gear of the vehicle, a governor mounted on said shaft and actuated thereby, an insulating member reciprocally mounted on said shaft and actuated in its reciprocal movement by said governor and provided with a contact portion, a contact brush connecting the contact portion of said insulating member with a source of electrical energy, another contact brush positioned in engagement with the contact member of said insulating member, a reciprocal support for said last mentioned contact brush, a terminal post, a yieldable contact member connecting said terminal post frictionally with said last mentioned contact brush, a control lever connected with said reciprocal support for shifting the same and said last mentioned contact brush relatively to the contact member of said insulating member, and an auxiliary switch means connected with said first mentioned contact brush and said terminal post for connecting the former with the latter when the contact member of said insulating member is shifted to an extreme position by said governor when rotating rapidly.

5. In a vehicle speed indicating and control means of the class described, a shaft connected with the running gear of the vehicle, a governor mounted on said shaft and actuated thereby, an insulating member reciprocally mounted on said shaft and actuated in its reciprocal movement by said governor and provided with a contact portion, a contact brush connecting the contact portion of said insulating member with a source of electrical energy, another contact brush positioned in engagement with the contact member of said insulating member, a reciprocal support for said last mentioned contact brush, a terminal post, a yieldable contact member connecting said terminal post frictionally with said last mentioned contact brush, a control lever connected with said reciprocal support for shifting the same and said last mentioned contact brush relatively to the contact member of said insulating member, a pair of spaced apart switch members, the one being connected with said first mentioned contact brush and the other being connected with said terminal post, and a blade switch member secured to and actuated by said control lever adapted to connect said switch members when said control lever is shifted to an extreme position.

6. In a vehicle speed limit indicating means of the class described, a shaft connected with the running gear of the vehicle, a governor mounted in connection with said shaft, a contact member mounted on said shaft and adapted to be reciprocally actuated by said governor and insulated from said shaft and said governor, a conductor connecting said contact member with a source of electrical energy, a contact brush support reciprocally mounted contiguous to said shaft, a contact brush mounted on said brush support and adapted to be engaged by said contact member when the same is shifted by said governor, a terminal post, a flexible contact member frictionally connecting said terminal post with said contact brush, and a signal means connected with said terminal post.

7. In a vehicle speed limit indicating means of the class described, a shaft connected with the running gear of the vehicle, a governor mounted in connection with said shaft, a contact member mounted on said shaft and adapted to be reciprocally actuated by said governor and insulated from said shaft and said governor, a conductor connecting said contact member with a source of electrical energy, a contact brush support reciprocally mounted contiguous to said shaft, a contact brush mounted on said brush support and adapted to be engaged by said contact member when the same is shifted by said governor, a terminal post, a flexible contact member frictionally connecting said terminal post with said contact brush, a signal means connected with said terminal post, and a control lever connected with said brush support adapted to variously shift the same relatively to said contact member.

8. In a vehicle speed limit signaling means of the class described, the combination with the running gear and the speedometer of the vehicle, of a revoluble member connected with said speedometer, a flexible speedometer drive-chain connecting the running gear of said vehicle with said revoluble member, a governor mounted contiguous to said revoluble member and adapted to be actuated thereby, a contact member mounted on said revoluble member and reciprocally actuated by said governor and insulated therefrom and said revoluble member, a conductor connecting said contact member with a source of electrical energy, a contact brush support reciprocally mounted contiguous to said shaft, a contact brush mounted on said brush support and adapted to be engaged by said contact member when the same is shifted by said governor, a terminal post, a flexible contact member frictionally connecting said terminal post with said contact brush, and a signal means connected with said terminal post.

In testimony whereof, I have hereunto set my hand at San Diego, California, this 7th day of November, 1924.

LEE ROY CORDRAY.